July 12, 1938. W. G. NOACK ET AL Re. 20,796

HEAT EXCHANGE PLANT

Original Filed Feb. 23, 1934

Inventors
Walter Gustav Noack
Paul Max Schattschneider
per Karl A. Mayr.
Attorney.

Reissued July 12, 1938

Re. 20,796

UNITED STATES PATENT OFFICE 20,796

HEAT EXCHANGE PLANT

Walter Gustav Noack, Baden, Switzerland, and Paul Max Schattschneider, Seckenheim, Germany, assignors to Aktiengesellschaft Brown, Boveri & Cie, Baden, Switzerland Original No. 1,997,229, dated April 9, 1935, Serial No. 712,574, February 23, 1934. Application for reissue July 14, 1936, Serial No. 90,620. In Germany February 20, 1933

20 Claims. (Cl. 263—19)

The present invention relates to a plant for exchanging heat from a hot gas to other mediums, more particularly to blast-heating plants.

An object of this invention is the provision of a plant which produces large amounts of highly heated mediums such as air and requires only small space and little and inexpensive material for the heat exchanging surfaces.

An object of this invention is to provide an air heating plant for blast furnaces in which the fluid or gaseous heat carrier moves at very high velocities over the heat exchanging surfaces and in which the production of said high velocities requires little power.

An object of this invention resides in the provision of an air heating plant for blast furnaces in which the fluid or gaseous heat carrier moves at very high velocities over metallic heat exchanging surfaces and in which the production of said high velocities requires little power which is supplied by said heat carrier.

A further object of this invention is the provision of a blast-heating plant operating with high velocities of the heat exchanging, heat transporting mediums and in which the power for producing said high velocities is produced by one of the mediums itself and in which the heating medium passes first through a steam-boiler whereby its temperature is reduced and then over the heating surfaces of the blast heater which may be built of metal because the temperature of the heating gas is reduced in the steam-boiler to a point which is not harmful to metallic heating surfaces.

Another object of this invention is to provide a blast-heating plant which is a substantially selfcontained unit, which operates with very high velocities of the heat exchanging and heat transporting mediums and in which the power for producing said high velocities is produced by one of the mediums itself.

The heat transfer conditions in heat exchangers can be greatly improved by increasing the velocity at which the mediums pass over the heat absorbing or heat spending surfaces. The increase of the velocity, however, can only be obtained by increasing the initial pressure of the mediums, which entails the use of expensive blowers requiring much power, heavy piping etc. The advantages gained by increasing the velocity are generally completely counterbalanced by the first cost of the plant and the expense of its operation. But, if pressure and velocity are increased to an extraordinary degree, and, particularly, if the power required for producing said pressure and velocity is largely or totally supplied by the pressure medium itself, the savings in heating surface, space, weight, and first cost of the plant are so great that the disadvantages entailed by the use of higher pressures and velocities are negligible as compared with the advantages obtained.

For many reasons, metals and alloys which withstand high temperatures are greatly to be preferred to fire bricks or the like for use as material for the heat exchanging surfaces. However, the commercial metals used for this purpose can not stand the high temperatures that can be employed when using bricks. For this reason, the heating gases must be produced with much more excess air in order to lower their temperature, i. e., with reduced efficiency. In order to avoid this method, steam generators are used which employ the gases as heating medium and, at the same time, lower their temperature. If, for this purpose, pressure-fired steam generators are employed operating with high heating gas velocities, they have the advantage that the high gas velocities required for the efficient operation of the blast-heater or heat-exchanger are available from this type of boiler.

It is an object of this invention to provide a hot blast-heater or similar heat-exchanger arranged in series with a steam generator with respect to the flow of heating gas, the heating gases passing at high velocity over metallic heating surfaces of the air heater after they have been sufficiently cooled in the steam generator, the gases being driven through the steam generator and the heat-exchanger by the same blower or compressor which is driven by a gas turbine using said heating gas as driving agent.

An object of the present invention is the provision of a heat-exchanger plant in which the heating gases operate at elevated pressure and at high velocity in order to reduce the dimensions of the heat transmitting surfaces and the pipings and, particularly, to reduce the size and cost of the blast-heater which may have metallic heating surfaces because the gases are cooled in a steam boiler before entering the air heater which operates as indirect heater and not as regenerative heater.

Another object of this invention is the provision of a heat-exchanger plant according to the foregoing object in which the gas pressure is maintained by the throttle action of the nozzles of a gas turbine using the heating gas as operating medium, whereby the energy required to produce the desired gas pressure and velocity is largely or wholly supplied by the gas itself so that the gain obtained by the use of high pressure and temperature and the saving in space and cost resulting therefrom is a net gain and is not reduced by the power requirements of the compressor.

Further and other objects of the present invention will be hereinafter set forth in the accompanying specification and claims and shown in the drawing which, by way of illustration, shows what we now consider to be a preferred embodiment of our invention.

Figure 1:
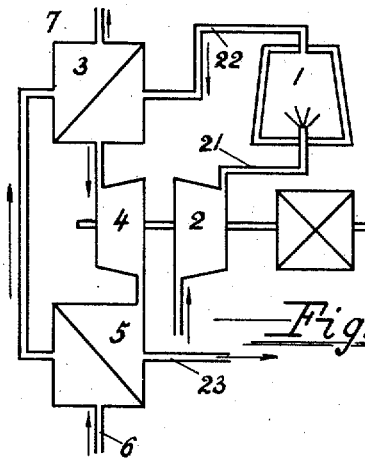
Fig. 1 is a diagram of parts and connections of a plant according to our invention.

Referring more particularly to Fig. 1 of the drawing: 1 is a hot gas producer which may be a steam boiler, a blast furnace or any apparatus serving a chemical or thermal process producing hot gases as a by-product. The gas delivered from apparatus 1 is under high pressure which is obtained by supplying, for instance, the combustion air or combustion gas under high pressure to the apparatus and producing said high pressure by the blower or compressor 2, the discharge side of which is connected with apparatus 1 by conduit 21. The hot gases—in the case of a steam generator, the products of combustion—are directed under high pressure into heat-exchanger 3 through conduit 22. They expand to a certain degree in this heat-exchanger and pass it at very high velocity; due to the great density of gas under pressure and the high velocities, the heat transfer conditions are extremely favorable within the exchanger, and a large amount of heat is given up from the gases to comparatively small heating surfaces. From heat-exchanger 3, the gases pass into gas turbine 4, expand further therein and drive blower 2 which is directly and operatively connected with turbine 4. Most of the pressure and heat still available in the gas is absorbed in turbine 4 and transformed into rotary power which is used to operate compressor 2. The heat contained in the gas exhausting from the gas turbine can be absorbed by another heat-exchanger 5 connected to turbine 4. The heating gas finally leaves the plant through conduit 23. The medium to be heated, for example, the air in the case of air preheaters, blast heaters for blast furnaces, enters heater 5 through conduit 6, absorbs the heat contained in the gases exhausting from turbine 4, and is conducted into heater 3, where it absorbs further heat from the hot gases emerging from the hot gas producer 1. The air leaves the plant highly heated through conduit 7. If the power generated in turbine 4 is not sufficient to operate compressor 2, a supplementary motor 8 must be provided which can also be used for starting up and regulating the plant. Motor 8 may be a steam turbine, an electric motor or an internal combustion engine.

In many cases, the medium to be heated must be under a certain pressure as, for example, the air for blast furnaces. For this purpose, a compressor must be provided. The power for driving the compressor may be provided by a steam turbine, the steam being generated in a boiler, the flue gas of which serves as heating medium for the air heaters. The highest temperature stage of the gases is thus used for producing steam, and the gases enter the heat-exchanger at reduced temperature. This arrangement makes it possible to operate with fuel mixtures of high heat content, i. e., with little excess air without endangering the heating surfaces of the primary heat-exchanger by too high temperatures.

Figure 2:
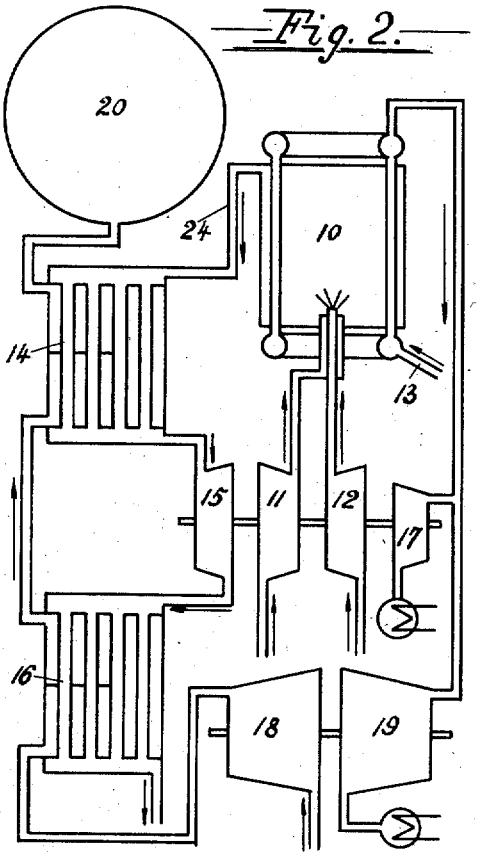
Fig. 2 is a diagram of parts and connections of an amplified plant according to our invention used in connection with a blast furnace.

A plant of the kind described in the foregoing paragraph is diagrammatically illustrated in Fig. 2. 10 designates a steam boiler, the combustion chamber of which is fed with fuel gas and air under high pressure. This pressure is produced in the blowers 11 and 12, one supplying the fuel gas and the other the combustion air. The mixture burns at elevated pressure. The resulting combustion gases transfer part of their heat to the feed water entering the boiler through conduit 13 and transform it into steam. The combustion gases leave boiler 10 through conduit 24 and enter the secondary heater 14 at a reduced temperature. After having given up a further part of their heat in exchanger 14, the gases—still hot—enter the gas turbine 15. The exhaust from turbine 15 enters the primary blast heater 16 and emerges therefrom into the open air. Should there still be a considerable amount of heat contained in the gases, this may be transmitted to the feed water or other media in further heat-exchangers operating at lower temperatures.

Gas turbine 15 drives the already mentioned blowers or compressors 11 and 12. A steam turbine 17 is provided and operatively connected to the blowers 11 and 12 for supplying supplementary power in case the power available from turbine 15 is not sufficient. This turbine normally receives steam from boiler 10; during the starting-up period from another source. The bulk of the steam produced in boiler 10 is used for operating turbine 19 which drives the blast compressor 18. Compressor 18 supplies the air for the blast furnace 20. This air is heated in heaters 16 and 14 through which it passes consecutively. By splitting the blast heaters into several stages, some of which are arranged ahead of and some after the gas turbine with respect to the gas flow, an operation of each individual part of the plant is assured at conditions most suitable for the individual parts. Whereas certain steel alloys, for instance, can safely be used in connection with very high temperatures in the stationary parts of the heat-exchangers 7 and 14, the same material can be used for the moving parts of the gas turbines 4 and 5 only at reduced temperatures where, in addition to the stresses caused by the temperature, stresses caused by centrifugal and bending forces must be encountered. The heat-exchangers 5 and 16 arranged after the gas turbines with respect to the flow of gas can be built of much cheaper material such as ordinary steel.

In the embodiment of our invention according to Fig. 2, the blower plant for supplying the plant for producing the heating gas and the steam is separate from the compressor plant for the blast. This separation renders the steam generation independent and is, therefore, advantageous. In certain cases, the blower or compressor for the combustion air from the boiler may be omitted and the air taken from the blast compressor. This simplification, however, is only possible in plants where steam and blast consumption are in proportion with respect to each other.

Figure 3:
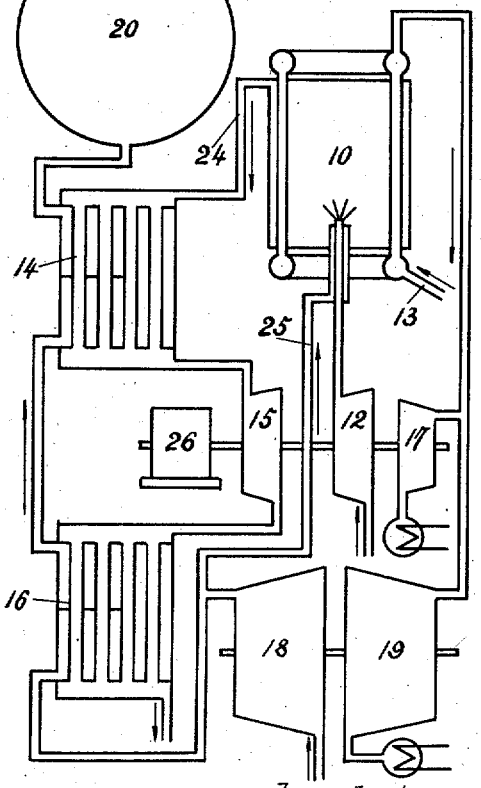
Figs. 3 and 4 are diagrams of parts and connections of modifications of the plants according to our invention.

Such a plant is diagrammatically illustrated by Fig. 3. Conduit 25 connects the discharge end of compressor 18 with boiler 10. In this case, surplus power is available from the gas turbine 15 which can be used for operating an electric generator 26.

Figure 4:
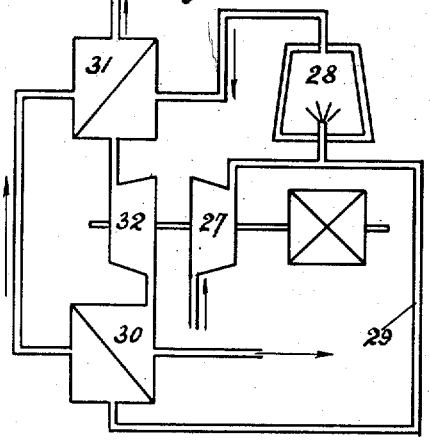

An alternative plant of this type is shown in Fig. 4. In this plant, compressor 27 supplies air to the heating gas producer 28 as well as through conduit 29 to the air heaters 30 and 31, compressor 27 being driven by the gas turbine 32 receiving heating gas emerging from the air heater 31.

The pressure of the gas used in connection with a plant according to our invention is within the range of 23 to 45 lbs./sq. in. The gas velocities in the heat-exchangers are at least 180'/sec. The velocity of the gas passing under pressure over the heating surfaces of the steam generator is in the neighborhood of 600'/sec.

While we believe the above described embodiments of our invention to be preferred embodiments, we wish it to be understood that we do not desire to be limited to the exact details of process, design, and construction shown and described, for obvious modifications will occur to a person skilled in the art.

What we claim is:

1. An air-heating plant for producing large amounts of highly heated air, comprising a high pressure, high velocity air heater having metallic heating surfaces separating a section of said air-heater having provisions for the passage of highly heated combustion gases for heating said metallic surfaces by passing through said air-heater at high pressure and high velocity from a second section having provisions for the passage of air highly heated by heat transferred from said metallic heating surfaces and said highly heated combustion gases, a high pressure furnace producing hot high pressure combustion gases for providing the highly heated combustion gases passing through said air-heater, a steam generator directly associated with said high pressure furnace and interposed in the path of the hot high pressure gases between said high pressure furnace and said air-heater and reducing the temperature of the hot gases emanating from said high pressure furnace to a point which is not harmful to said metallic heating surfaces of said air-heater, conduit means between said steam generator and air-heater for conducting to said air-heater said highly heated combustion gases heated to a temperature rendered less than the temperature of the hot high pressure combustion gases produced in said high pressure furnace as the result of heat extracted therefrom by said steam generator, and conduit means having connection with said air-heater for conducting heated air from said air-heater to a source of use foreign to the air-heating plant.

2. Air-heater plant comprising an air-heater having metallic heating surfaces, a high pressure furnace for producing hot high pressure combustion gases for heating said air-heater by passing therethrough at high pressure and high velocity, a steam generator directly associated with said high pressure furnace and interposed in the path of the hot high pressure gases between said furnace and said air-heater for reducing the temperature of the hot gases to a point which is not harmful to said metallic heating surfaces of said air-heater through which the gases pass at high pressure and high velocity, a gas turbine also interposed in the path of and adapted to be operated by the hot high pressure gases, and an air compressor operatively connected to and driven by said gas turbine for supplying high pressure combustion air to said furnace.

3. Air-heater plant comprising a high pressure, high velocity air-heater having metallic heating surfaces, a high pressure furnace for producing hot high pressure combustion gases for heating said air-heater by passing at high pressure and high velocity therethrough, a steam generator adapted to be heated by hot gases passing at high pressure and high velocity therethrough and being interposed in the path of the hot high pressure gases between said furnace and said air-heater to reduce the temperature of the hot gases to a point which is not harmful to said metallic heating surfaces of said air-heater, a gas turbine also interposed in the path of and adapted to be operated by the hot high pressure gases, and an air compressor operatively connected to and driven by said gas turbine for supplying high pressure combustion air to said furnace and for supplying the air to be heated in said air-heater under high pressure to said air-heater through which it passes at high velocity.

4. Hot blast plant comprising a hot gas heated, high pressure, high velocity air-heater having metallic heating surfaces and consisting of a plurality of independent units serially connected with respect to air flow as well as hot gas flow, a high pressure furnace for producing hot high pressure combustion gases for heating said air-heater by passing at high pressure and high velocity therethrough, a steam generator associated with said furnace and adapted to be heated by hot gases passing at high pressure and velocity through said generator, whereby the temperature of the hot gases is reduced to a point which is not harmful to said metallic heating surfaces of said air-heater, a gas turbine interposed in the path of said high pressure gases and in between two of said air-heater units receiving gas emerging from one of said units and discharging gas into another of said units and adapted to be operated by the hot high pressure gases, and an air-compressor operatively connected to and driven by said gas turbine for supplying high pressure combustion air to said furnace and for supplying the air to be heated in said air-heater under high pressure to said air-heater through which it passes at high velocity.

5. Hot blast plant comprising a hot gas heated, high pressure, high velocity air-heater having metallic heating surfaces and consisting of a plurality of independent units serially connected with respect to the air flow as well as to the hot gas flow, a high pressure furnace for producing hot high pressure combustion gases for heating said air-heater by passing at high pressure and high velocity therethrough, a steam generator associated with said furnace and adapted to be heated by hot gases passing at high pressure and velocity through said generator, whereby the temperature of the hot gases is reduced to a point which is not harmful to said metallic heating surfaces of said air-heater, a gas turbine interposed in the path of the high pressure gases and in between two of said air-heater units receiving gas emerging from one of said units and discharging gas into another of said units and adapted to be operated by the hot high pressure gases, an air compressor operatively connected to and driven by said gas turbine for supplying high pressure combustion air to said furnace, and a fuel supply means also operatively connected to and driven by said gas turbine for supplying fuel to said furnace.

6. Hot blast plant comprising a hot gas heated, high pressure, high velocity air-heater having metallic heating surfaces and consisting of a plurality of independent units serially connected with respect to the air flow as well as to the hot gas flow, a high pressure furnace for producing hot, high pressure combustion gases for heating said air-heater by passing at high pressure and high velocity therethrough, a steam generator associated with said furnace and adapted to be heated by hot gases passing at high pressure and velocity through said generator, whereby the temperature of the hot gases is reduced to a point which is not harmful to said metallic heating surfaces of said air-heater, a gas turbine interposed in the path of the high pressure gases and in between two of said air-heater units, receiving gas emerging from one of said units and discharging gas into another of said units and adapted to be operated by the hot, high pressure gases, an air compressor operatively connected to and driven by said gas turbine for supplying high pressure combustion air to said furnace, a steam turbine operated by the steam generated in said steam generator, and an air compressor connected to and driven by said steam turbine and supplying the air to be heated in said air-heater by passing at high pressure and high velocity therethrough.

7. Hot blast plant comprising a hot gas heated, high pressure, high velocity air-heater having metallic heating surfaces and consisting of a plurality of independent units serially connected with respect to the air flow as well as to the hot gas flow, a high pressure furnace for producing hot, high pressure combustion gases for heating said air-heater by passing at high pressure and high velocity therethrough, a steam generator associated with said furnace and adapted to be heated by hot gases passing at high pressure and velocity through said generator, whereby the temperature of the hot gases is reduced to a point which is not harmful to said metallic heating surfaces of said air-heater, a gas turbine interposed in the path of the high pressure gases and in between two of said air-heater units receiving gas emerging from one of said units and discharging gas into another of said units and adapted to be operated by the hot, high pressure gases, a fuel supply means connected to and driven by said gas turbine for supplying fuel to said furnace, a steam turbine connected to and operated by the steam generated in said steam generator, and an air compressor connected to and driven by said steam turbine and supplying the air to be heated in said air-heater to said air-heater and also supplying the combustion air at high pressure to said furnace.

8. Hot blast plant comprising a hot gas heated, high pressure, high velocity air-heater having metallic heating surfaces, a high pressure furnace for producing hot, high pressure combustion gases for heating said air-heater by passing at high pressure and high velocity therethrough, a steam generator associated with said furnace and adapted to be heated by hot gases passing at high pressure and velocity through said steam generator, whereby the temperature of the hot gases is reduced to a point which is not harmful to said metallic heating surfaces of said air-heater, a gas turbine interposed in the path of the high pressure gases and adapted to be operated by the hot, high pressure gases, an air compressor operatively connected to and driven by said gas turbine for supplying high pressure combustion air to said furnace, a steam turbine operated by the steam generated in said steam generator, and an air compressor connected to and driven by said steam turbine and supplying the air to be heated in said air-heater by passing at high pressure and high velocity therethrough.

9. Heat transfer plant comprising a heater, a high pressure gas producing furnace connected with said heater for gas flow, whereby the gases produced in said furnace heat said heater by passing therethrough at high pressure and high velocity for obtaining high heat transfer efficiency, another heater for heating a medium different from that heated in said first mentioned heater, said other heater being connected to said first mentioned heater for gas flow and being heated by gases from said furnace after they have passed through and have been cooled in said first mentioned heater, a blower connected to and supplying high pressure gaseous combustion material to said furnace, and a gas machine connected to said other heater for gas flow and receiving operating gas therefrom, whereby the temperature of the gases operating said gas machine is reduced to such a degree that safe operation and long life of said machine are assured.

10. Heat transfer plant comprising a heater, a high pressure gas producing furnace connected to said heater for gas flow, whereby the gases produced in said furnace heat said heater by passing therethrough at high pressure and high velocity for obtaining high heat transfer efficiency, another heater for heating a medium different from that heated in said first mentioned heater, said other heater being connected to said first mentioned heater for gas flow and being heated by gases from said furnace after they have passed through and have been cooled in said first mentioned heater, an air blower connected to and supplying high pressure combustion air to said furnace, and a gas machine connected to said other heater for gas flow and receiving operating gas therefrom, whereby the temperature of the gases operating said gas machine is reduced to such a degree that safe operation and long life of said machine are assured.

11. An air-heating plant for producing large amounts of highly heated air, comprising a high pressure, high velocity air heater having metallic heating surfaces separating a section of said air-heater having provisions for the passage of highly heated combustion gases for heating said metallic surfaces by passing through said air-heater at high pressure and high velocity from a second section having provisions for the passage of air highly heated by heat transferred from said metallic heating surfaces and said highly heated combustion gases, a high pressure furnace producing hot high pressure combustion gases for providing the highly heated combustion gases passing through said air-heater, a heat consumer directly associated with said high pressure furnace and interposed in the path of the hot high pressure gases between said high pressure furnace and said air-heater and reducing the temperature of the hot gases emanating from said high pressure furnace to a point which is not harmful to said metallic heating surfaces of said air-heater, conduit means between said heat consumer and air-heater for conducting to said air-heater said highly heated combustion gases heated to a temperature rendered less than the temperature of the hot high pressure combustion gases produced in said high pressure furnace as the result of heat extracted therefrom by said heat consumer, and conduit means having connection with said air-heater for conducting heated air from said air-heater to a source of use foreign to the air-heating plant.

12. An air-heater plant comprising an air-heater having metallic heating surfaces, a high pressure furnace for producing hot high pressure combustion gases for heating said air-heater by passing therethrough at high pressure and high velocity, a heat consumer directly connected with said high pressure furnace and interposed in the path of the hot high pressure gases between said furnace and said air-heater for reducing the temperature of the hot gases to a point which is not harmful to said metallic heating surfaces of said air-heater through which the gases pass at high pressure and high velocity, a gas turbine also interposed in the path of and adapted to be operated by the hot high pressure gases, and an air compressor operatively connected to and driven by said gas turbine for supplying high pressure combustion air to said furnace.

13. An air-heater plant comprising a high pressure high velocity air-heater having metallic heating surfaces, a high pressure furnace for producing hot high pressure combustion gases for heating said air-heater by passing at high pressure and high velocity therethrough, a heat consumer adapted to be heated by hot gases passing at high pressure and high velocity therethrough and being interposed in the path of the hot high pressure gases between said furnace and said air-heater to reduce the temperature of the hot gases to a point which is not harmful to said metallic heating surfaces of said air-heater, a gas turbine also interposed in the path of and adapted to be operated by the hot high pressure gases, and an air compressor operatively connected to and driven by said gas turbine and being individually connected with said furnace and with said air-heater for supplying high pressure combustion air to said furnace and for supplying the air to be heated in said air-heater under high pressure to said air-heater through which it passes at high velocity.

14. A hot blast plant comprising a hot gas heated high pressure high velocity air-heater having metallic heating surfaces and consisting of a plurality of idependent units serially connected with respect to the air flow as well as the hot gas flow, a high pressure furnace for producing hot high pressure combustion gases for heating said air-heater by passing at high pressure and high velocity therethrough, a heat consumer connected with said furnace and adapted to be heated by hot gases passing at high pressure and high velocity through said heat consumer, whereby the temperature of the hot gases is reduced to a point which is not harmful to said metallic heating surfaces of said air-heater, a gas turbine interposed in the path of the high pressure gases and in between two of said air-heater units and receiving gas emerging from one of said units and discharging gas into another of said units and being adapted to be operated by the hot high pressure gases, and an air compressor operatively connected to and driven by said gas turbine for supplying high pressure combustion air to said furnace and for supplying the air to be heated in said air-heater under high pressure to said air-heater through which it passes at high velocity.

15. A hot blast plant comprising a hot gas heated high pressure high velocity air-heater having metallic heating surfaces and consisting of a plurality of independent units serially connected with respect to the air flow as well as the hot gas flow, a high pressure furnace for producing hot high pressure combustion gases for heating said air-heater by passing at high pressure and high velocity therethrough, a heat consumer connected with said furnace and adapted to be heated by hot gases passing at high pressure and high velocity through said heat consumer, whereby the temperature of the hot gases is reduced to a point which is not harmful to said metallic heating surfaces of said air-heater, a gas turbine interposed in the path of the high pressure gases and in between two of said air-heater units receiving gas emerging from one of said units and discharging gas into another of said units and being adapted to be operated by the hot high pressure gases, an air compressor operatively connected to and driven by said gas turbine for supplying high pressure combustion air to said furnace, and a fuel supply means also operatively connected to and driven by said gas turbine for supplying fuel to said furnace.

16. A heat transfer plant comprising a high pressure and high velocity gas heated heater having heating surfaces, means for producing a hot, high pressure medium for heating said heater by passing therethrough at high pressure and high velocity, and a high pressure and high velocity gas heated heat consumer directly connected with said means and interposed in the path of the hot, high pressure medium between said means and said heater for reducing the temperature of the hot gases to a point which is not harmful to said heating surfaces of said heater through which the gases pass at high pressure and high velocity.

17. An air-heater plant comprising an air-heater having metallic heating surfaces, means for producing hot, high pressure gases for heating said air-heater by passing therethrough at high pressure and high velocity, a heat consumer directly connected with said means and interposed in the path of the hot, high pressure gases between said means and said air-heater for reducing the temperature of the hot gases to a point which is not harmful to said metallic heating surfaces of said air-heater through which the gases pass at high pressure and high velocity, a gas turbine also interposed in the path of and adapted to be operated by the hot, high pressure gases, and an air compressor operatively connected to and driven by said gas turbine for supplying high pressure combustion air to said furnace.

18. In combination, a high pressure, high velocity gas heated hot blast producer for a blast furnace, said hot blast producer comprising metallic heating surfaces, a high pressure furnace connected for gas flow with said heating surfaces for supplying hot, high pressure gases for heating said surfaces, other heat absorbing surfaces connected with said furnace for reducing the temperature of the high pressure gases to a degree which is not harmful to said metallic heating surfaces, a blast furnace and a conduit connecting said blast producer and said blast furnace for hot air flow.

19. In combination, a high pressure, high velocity gas heated hot blast producer for a blast furnace, said hot blast producer comprising metallic heating surfaces, a high pressure furnace connected for gas flow with said heating surfaces for supplying hot, high pressure gases for heating said surfaces, other heat absorbing surfaces connected with said furnace for reducing the temperature of the high pressure gases to a degree which is not harmful to said metallic heating surfaces, said other heat absorbing surfaces comprising tubular conduits within said high pressure furnace and being adapted to heat and evaporate a liquid which circulates inside of said conduits, and a conduit connecting said blast producer and said blast furnace for hot air flow.

20. A heating plant comprising a high pressure furnace producing a hot, high pressure heating gas, a heat consumer connected for gas flow with said furnace and receiving heating gas therefrom, an auxiliary gas turbine connected for gas flow with said heat consumer and receiving operating gas therefrom, an auxiliary air compressor connected to and being operated by said gas turbine and supplying high pressure combustion air to said furnace, and heat absorbing surfaces directly connected with said furnace for reducing the temperature of the high pressure gases to a degree as is desirable for said heat consumer.

WALTER GUSTAV NOACK.
PAUL MAX SCHATTSCHNEIDER.